United States Patent
Chandra et al.

(10) Patent No.: US 11,170,340 B1
(45) Date of Patent: Nov. 9, 2021

(54) DYNAMIC CONTAINERIZATION BASED ON A SEQUENCE OF DELIVERY LOCATIONS

(71) Applicant: Amazon Technologies, Inc., Seattle, WA (US)

(72) Inventors: Akshay Satish Chandra, Seattle, WA (US); Sujan Akella, Bellevue, WA (US); Peter Auchterlonie, Kirkland, WA (US); Sujit Bhosale, Issaquah, WA (US); Sekhar Putcha, Seattle, WA (US); Beryl Tomay, Seattle, WA (US); Vinoo Vasudevan, Bellevue, WA (US); Aravind Yalamanchi, Lynnwood, WA (US)

(73) Assignee: Amazon Technologies, Inc., Seattle, WA (US)

( * ) Notice: Subject to any disclaimer, the term of this patent is extended or adjusted under 35 U.S.C. 154(b) by 701 days.

(21) Appl. No.: 15/332,487

(22) Filed: Oct. 24, 2016

(51) Int. Cl.
  *G06Q 10/08* (2012.01)
  *G06K 19/06* (2006.01)
  *G06K 7/14* (2006.01)

(52) U.S. Cl.
  CPC ....... *G06Q 10/0838* (2013.01); *G06K 7/1413* (2013.01); *G06K 19/06028* (2013.01)

(58) Field of Classification Search
  CPC ............. G06Q 10/0838; G06K 7/1413; G06K 19/06028
  USPC ....................................................... 705/341
  See application file for complete search history.

(56) References Cited

U.S. PATENT DOCUMENTS

| | | | | |
|---|---|---|---|---|
| 8,326,679 B1* | 12/2012 | Rowe | ..................... | G06Q 10/08 705/7.38 |
| 8,560,461 B1* | 10/2013 | Tian | ..................... | G06Q 10/087 705/332 |
| 10,824,982 B1* | 11/2020 | Whitehouse | ....... | G06Q 10/0832 |
| 2002/0010661 A1* | 1/2002 | Waddington | ........... | G06Q 10/08 705/28 |

(Continued)

FOREIGN PATENT DOCUMENTS

WO  WO-2010118388 A1 * 10/2010 ........... G06Q 10/087

OTHER PUBLICATIONS

S. Carr and W. Jang, "Hub arc selection for freight consolidation," 2009, IEEE International Conference on Industrial Engineering and Engineering Management, pp. 1961-1963. (Year: 2009).*

*Primary Examiner* — John P Go
*Assistant Examiner* — Hunter A Molnar
(74) *Attorney, Agent, or Firm* — Kilpatrick Townsend & Stockton LLP

(57) ABSTRACT

Systems and methods for efficiently managing item deliveries are described. In an example, a computer system may identify a first handling sequence of a first item and sequence steps along the handling sequence. The sequence steps may be common to a different handling sequence of a second item. The computer system may determine that the first item should be grouped in a container grouping the second item based on the sequence steps being common. The computer system may generate an identifier and metadata for the container. The identifier may identify the container to handling systems. The metadata may identify the items of the container, a first sequence step to group the first item, and a second sequence step to ungroup the first item. The computer system may distribute the identifier and/or the metadata to the handling systems.

20 Claims, 9 Drawing Sheets

(56) References Cited

U.S. PATENT DOCUMENTS

| | | | |
|---|---|---|---|
| 2003/0172007 A1* | 9/2003 | Helmolt | G06Q 10/06316 705/28 |
| 2005/0024200 A1* | 2/2005 | Lambright | G06K 17/0029 340/539.1 |
| 2005/0149373 A1* | 7/2005 | Amling | G06Q 10/08 705/28 |
| 2006/0241990 A1* | 10/2006 | Sun | G06Q 10/08 705/7.26 |
| 2007/0136079 A1* | 6/2007 | Beykirch | G06Q 10/08 705/338 |
| 2008/0306795 A1* | 12/2008 | Ho | G06Q 10/047 705/7.26 |
| 2013/0277425 A1* | 10/2013 | Sharma | G06Q 10/087 235/376 |
| 2017/0308850 A1* | 10/2017 | Roush | G06Q 10/0836 |

* cited by examiner

DYNAMIC CONTAINERIZATION BASED ON A SEQUENCE OF DELIVERY LOCATIONS

BACKGROUND

More and more users and entities are turning to online services for day-to-day activities. Many of the services span both the digital world and the physical world. For example, a user may operate a computing device to order an item from a web site. The item may be delivered from a storage facility to a delivery location of the user.

Generally, the delivery of the item may involve multiple physical locations in between the storage facility and the delivery destination. A delivery system may include the in between, physical locations. For example, the item may be delivered from the storage facility to a delivery hub. The delivery hub may also receive a number of items from a number of storage facilities. The items may be sorted for deliveries to respective delivery stations, loaded onto delivery vehicles, and sent forward to the delivery stations. This leg of the delivery may be referred to as the middle mile. One of the delivery stations may be responsible for deliveries to the user's delivery destination. At that delivery station, more refined sorting may occur. Accordingly, the item may be loaded onto a delivery vehicle for the final delivery. This leg of the delivery may be referred to as the last mile.

Changes to the volume of items, the geographical distribution of storage facilities, and/or the geographical distribution of the delivery locations may affect the efficiency and throughput of the delivery system. For instance, if capacity in the middle mile is exceeded due to a large volume of items, deliveries in the last mile may become untimely, thereby decreasing the throughput. Further, the efficiency and throughput are impacted by how the items are processed. Existing delivery systems typically process items on a per user basis and do not account for delivery paths across the user base. In other words, two items destined to two users are handled separately, even if the delivery paths of the two items may share some common legs in the middle mile or the last mile. In turn, separate handling generally necessitates a larger amount of capacity relative to joint handling. The larger amount of consumed capacity is, the lower amount of available capacity remains for handling other items and, thus, the lower the potential throughput may become.

DETAILED DESCRIPTION

Figure 1:
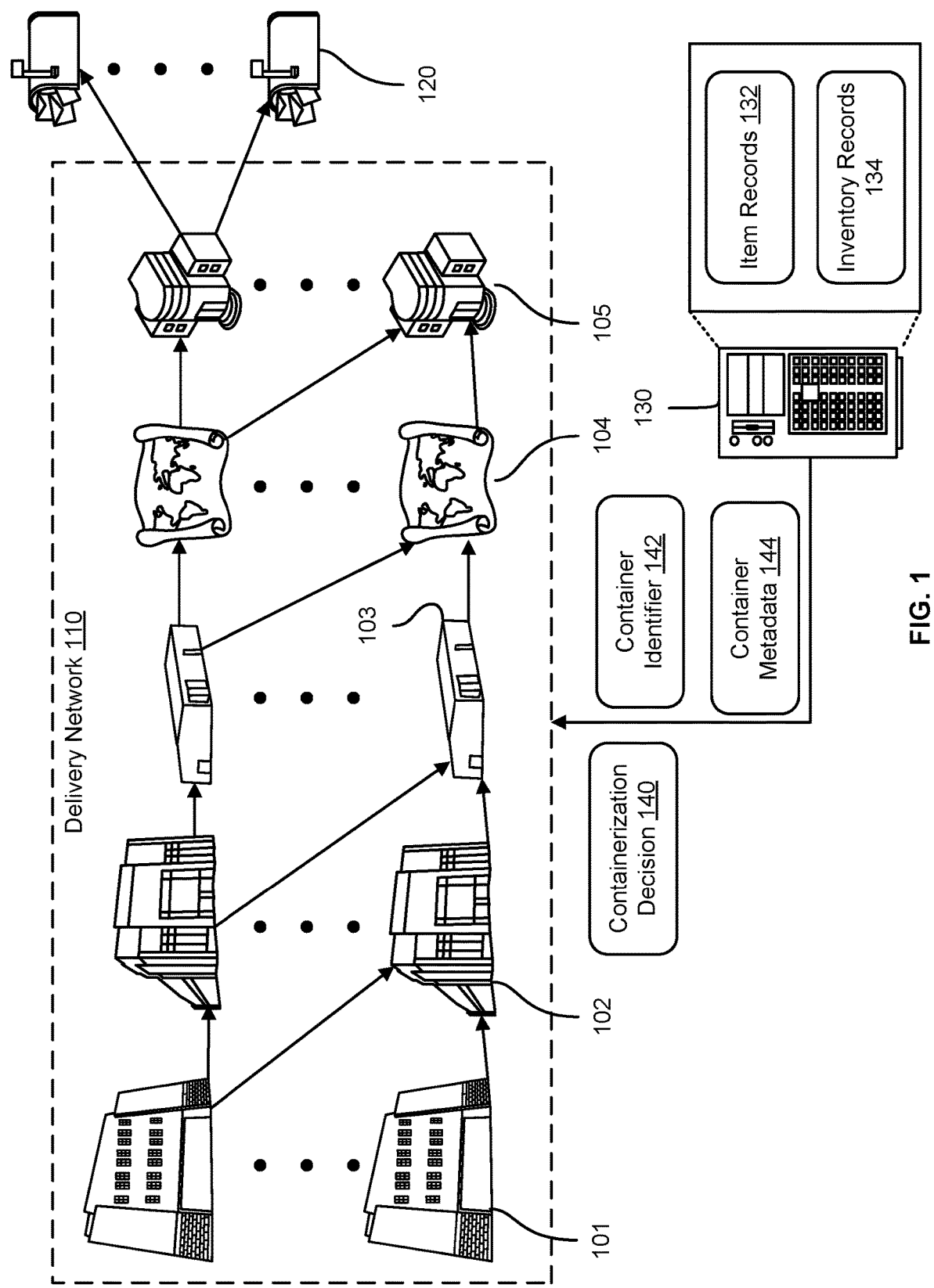
FIG. 1 illustrates an example environment for delivery items to end destinations, according to an embodiment of the present disclosure.

In the following description, various embodiments will be described. For purposes of explanation, specific configurations and details are set forth in order to provide a thorough understanding of the embodiments.

Embodiments of the present disclosure are directed to, among other things, efficiently managing item deliveries. An item delivery may include a delivery of a tangible item (generally referred to herein as an item) from a source location to a destination location along a delivery path. The item may be received and handled at different delivery locations within the delivery path prior to reaching the delivery destination.

On a global scale, items may travel different delivery paths to reach respective delivery destinations. Some portions of the delivery paths may be common even when the items are destined to different delivery locations. For example, a common set of delivery locations may receive and handle the items. For such items, a containerization approach may be applied. Specifically, the items may be added to a container, where the container may be a logical container or a physical container. The container may exist for the common portion of the delivery paths. An identifier may be generated to identify the container. Metadata may also be generated to identify the items, the start delivery location and the end delivery location of the common portion, and instructions for handling the container, among other information related to the container and/or the items. The identifier and metadata may be distributed to handling systems housed at the different delivery locations. Upon receipt of the items at the start delivery location, the items may be grouped in the container according to the metadata. From that point on, the handling systems may handle the container as a single item, as opposed to handling each of the container items separately. Upon receipt of the container at the end destination location, the container may be broken such that the contained items may be ungrouped. For the remaining portions of the travel paths, the items may be handled separately.

To illustrate and for the purpose of clarity, consider the example of two items ordered by two users and destined for deliveries to two different destination locations. A travel path may include a fulfillment center, a sortation center, a distribution station, a zone, an apartment building, all the way to a user's apartment. Specific to the two items, the travel path may be the same from the sortation center all the way to the apartment building. This may be the case when the two items originate from two different fulfillment centers and are destined to two apartments in the same apartment building. A delivery management system may determine that by grouping the two items in a same physical container, improvements (e.g., in term of efficiency, throughput, resource utilization, etc.) to the deliveries may be achieved. Accordingly, the delivery management may generate an identifier and metadata for the container. The identifier may be used to print a barcode unique to the container. The metadata may identify the two items and include instructions for containerizing the two items at the sortation center and de-containerizing the two items at the apartment building. Upon receipt at the sortation center, the two items may be scanned. The identifiers of the two items may be matched to the metadata, thereby triggering handling equipment at the sortation facility to add them to a same physical container and to print and attach the barcode to the physical container. Between the sortation center and the apartment building, the container may travel as a single item and may be handled accordingly. At the apartment building, a handheld device of a delivery operator may scan the barcode. Instructions to retrieve the two items from the physical container may be displayed at a user interface of the handheld device based on the metadata. The delivery operator may then ungroup the items from the container for separate deliveries to the two apartment units.

The containerization approach provides several technical advantages that improve existing delivery systems. One technical advantage involves achieving a higher delivery throughput given a certain capacity. Specifically, by creating on-demand containers, the total number of touches needed to handle items may be reduced because a single container of multiple items may be handled in lieu of handling each of the contained items separately. The reduction, in turn, may lead to faster pickups, deliveries, on-board transfers, while also decreasing route density, stops per route, and item search times. Another technical advantage involves the capability to dynamically adjust to the volume of items and capacity of an inventory system. Specifically, containers may be created on-demand at any location where a pickup needs to occur given the most up-to-date information about the volume and available capacity. Yet another technical advantage involves a reduction in computing processing. Specifically, an identifier and metadata of a container may contain the needed information to handle contained items. With a single scan of the identifier, handling instructions may be provided. This avoids the need to scan every single item and handle each item separately. Yet another technical advantage involves a reduction in manpower. For example, a delivery operator may be able to transfer a container of multiple items from one delivery vehicle to another based on a single scan of the container's identifier. In another example, a container may contain items destined to multiple units in a same apartment complex. By normalizing the delivery destinations of these items to the apartment complex and using the normalized address (e.g., a mailroom of the apartment complex, or a store where multiple users can access) as the delivery destination of the container, a single delivery operator may deliver the items rather than having to schedule multiple delivery operators.

FIG. 1 illustrates an example environment for delivery items to end destinations. The environment may include a delivery network 110. Specifically, items may be destined to destination locations 120. The items may originate from source locations. The delivery network 110 may or may not include the source locations. Regardless, the delivery paths of the items may involve stops at delivery locations within the delivery network 110. At each delivery location, an item may be grouped into a container or ungrouped from the container. The decision as to where and when to group and ungroup the item may be referred to herein as a containerization decision.

A management system 130 may be configured to dynamically generate the containerization decision based on information related to the volume of items and/or the capacity and desired throughput of the delivery network 110. Once grouped, the item may no longer be handled separately. Instead, the container containing the item and other items may be handled, thereby representing a collective handling of the contained items.

As illustrated, the delivery network 110 may include a number of delivery locations. Each delivery location may represent a location where an item and/or container may be received, processed, and prepared for delivery to a next delivery location or to a final destination location. Handling the item and/or container may generally refer to any of receiving, processing, and/or delivery preparation and may be performed using one or more handling systems. A handling system may include a computer system, operator devices (e.g., handheld devices), and/or material handling equipment configured to perform delivery-related actions on an item and/or container, such as scanning identifiers (e.g., barcodes), printing and attaching identifiers, moving, packing, unpacking, stowing, picking, or performing other deliver-related actions.

Some of the delivery locations may be managed by a particular entity, such as a service provider. Other delivery locations may be managed by different entities. All in all, a delivery location housing a handling system may be referred to as a handling facility or an item handling facility. FIG. 1 illustrates three types of handling facilities managed by a same service provider: a fulfillment center, a sortation center, and a delivery station. Specifically, a fulfillment center 101 may store items to fulfill customer orders for the items. The delivery network 110 may forwardly connect the fulfillment center 101 to sortation centers 102 and other fulfillment centers 101, among other delivery locations. A sortation center 102 may receive multiple items from one or more fulfillment centers 101 and other source locations and may sort the items into more refined geographic delivery regions. The delivery network 110 may forwardly connect the sortation center 102 to delivery stations 103 and other sortation centers 102, among other delivery locations. A delivery station 103 may receive multiple items from one or more sortation centers 102 and other source locations and more refined sorting may occur to prepare for deliveries to specific delivery zones 104. Each delivery zone 104 may represent a geographic area of certain resolution (e.g., corresponding to a certain predefined volume of deliveries or destination locations) and may represent a delivery location having that geographical resolution. Within each zones, multiple housing complexes 105 may exist. Each housing complex 105 may house multiple delivery destination 102 and may represent a delivery location responsible for these destinations 102.

Each of the handling facility may be associated with an inventory management system. Additionally or alternatively, the different handling facilities of the delivery network 110 may be associated with an inventory management system. Regardless, the inventory management system may be a computer system in communication with the management system 130 and the handling system(s) over one or more data networks. The inventory management system may track the locations of items and/or containers, update item records and inventory records, and/or may generate tasks to handle items and/or containers. In an example, the management system 130 may send a containerization decision to the inventory management system of the delivery network 110. In turn, the inventory management system may distribute the containerization decision (and/or related container identifiers and container metadata) to the appropriate handling systems and may, additionally or alternatively, generate and distribute tasks based on the containerization decision and related information to the appropriate handling systems.

Accordingly, an item destined to a destination location 102 may travel along a delivery path through the delivery network 110. The delivery path may include a sequence of the delivery locations, where each delivery location may represent a delivery node within the delivery network 110. The sequence may represent a particular order of traveling between the applicable delivery locations. Each delivery location may represent a sequence step along the delivery path. For example, the item may travel from one fulfillment center 101, to a sortation center 102, then to a delivery station 103, followed by a delivery zones 104, before reaching a housing complex 105 that contains the destination location 120. From the housing complex 105, the item may be delivered to the destination location 120. At each of the delivery location, the item may be handled by a handling system according to a sequence of steps. Each step may correspond to a task that may be defined by the inventory management system. Hence, the delivery path may represent a handling sequence (or more generally referred to as a sequence), where the handling sequence may include an ordered set of steps, and where a step of the handling sequence (e.g., or more generally referred to as a sequence step) may represent a delivery location and/or a handling task.

On a global scale, multiple items may be delivered to destination locations 120 along different delivery paths. A number of items may have a common sequence within the delivery network 110 along their respective delivery paths. In other words, The sequences along such delivery paths may share a common set of sequence steps representing a common sub-sequence along the delivery paths. These sequence steps may be delivery locations and/or tasks within a same delivery location or across multiple delivery locations. For example, two items (or some other numbers) may originate at the same fulfillment center 101, travel to a same sortation center 102 and delivery station 103, but their path may diverge from that point on. As such, the sequence of the particular fulfillment center-sortation center-delivery station may be common along the two delivery paths.

In the interest of clarity of explanation, a sequence of delivery locations is described herein in connection with containerization of items. However, the embodiments of the present disclosure are not limited as such. Specifically, the containerization may be additionally or alternatively applied to a sequence of tasks within one delivery location or across multiple delivery locations. Generally, if sequence steps (whether each is a delivery location or a task) are share a common set of sequence steps, a containerization decision may be generated to associate items with a container, to identify a particular sequence step where the items should be grouped in the container, and to identify another sequence step where the items should be ungrouped from the container.

To improve the delivery efficiency, items that share a common sequence of delivery locations may be containerized for the length of the sequence. Specifically, a common sequence may include at least a common start delivery location (e.g., where the items may start their common travel), a common end delivery location (e.g., where the travel of the items starts to diverge), and possibly other in-between delivery locations. A containerization decision may be generated to group the items in a container at the start delivery location and to ungroup the items from the container at the end delivery location. The container may then be used to collectively move the items along the common portion of the travel paths (e.g., between the start and end delivery locations). Rather than having to handle each of the items separately along that common portion, the container may be handled instead. To illustrate, and referring back to the two item example above, the items may be added to a physical container at the fulfillment center 101. Upon receipt at the delivery station 103, the two items may be removed from the physical container.

In an example, the containerization may span multiple hierarchies to further improve the delivery efficiency. Each level within the hierarchy may correspond to a common sequence of delivery locations. Two levels of the hierarchy may have at least one common delivery location. To illustrate, and referring back to the two item example above, further consider the situation where a third item may originate from a different fulfillment center 101 but may share the same sortation center 102 and delivery station 103. Depending on any delivery efficiency improvements, the third item and the physical container containing the first two items may be grouped in a logical container for the travel portion between sortation center 102 and the delivery station 103. The logical container may be used by handling systems at the sortation center 102 and the delivery station 103 to process the third item and the physical container. Further description of logical and physical containers is provided in the next figures.

The management system 130 may represent a computer system, such as a server, a cloud computing service, or a back end system, configured to generate a containerization decision 140. Generally, the containerization decision 140 may depend on improving the delivery efficiency through the delivery network 110. In other words, if the management system 130 determines that it is more efficient to containerize certain items, as opposed to handling such items separately, the containerization decision 140 may be generated and may identify the items and the respective start delivery location(s) and end delivery location(s).

The delivery efficiency may be defined across various efficiency dimensions. Example dimensions may include amount of utilized capacity, achieved throughput, computational burden (e.g., processing and memory utilization associated with sensing, scanning, instructing, and performing other handling-related actions), cost savings (e.g., cost of transportation, manpower, number of touches), and other efficiency-related considerations. Such dimensions can be captured by using a number optimization parameters, further described in the next figures.

Generally, the management system 130 may have access to item records 132 and inventory records 134, among other information. The item records 132 may correspond to customer orders for items and may identify the destination locations 120. The inventory records 134 may identify the source locations of the items. Based on the destination locations 120 and source locations, delivery paths and sequences of the delivery locations within the network 110 may be identified.

For items that should be delivered from the source locations within a period of time (e.g., the next two days or the next two hours), the management system 130 may compare the respective sequences to identify the common sub-sequences (e.g., the sequence commonalities, where each commonality between two or more delivery paths may indicate that such paths include one or more common sub-sequences of the delivery locations) and the particular items. Once identified, the management system 130 may generate various options to containerize the particular items. Each option may represent one way to group an item to a container at a potential start delivery location (e.g., one belonging to the common sub-sequence) or ungroup the item from the container at a potential end delivery location (e.g., also one belonging to the common sub-sequence). The management system 130 may estimate the resulting delivery efficiencies for these options and for the option of not containerizing at all. The option resulting in the most delivery efficiency gain may be selected. That option may be translated into a containerization decision 140.

To illustrate, and referring back to the two item example above, the common sub-sequence may include the particular fulfillment center 101, sortation center 102, and delivery station 103. There may be three options: create a container at the fulfillment center 101 to be broken at the delivery station, create a container at the fulfillment center 101 to be broken at the sortation center 102, or create a container at the sortation center 102 to be broken at the delivery stations 103. Each of these options may be further translated into an option for a logical container or an option for a physical container. There may be also an option to not containerize at all. The management system 103 may analyze the seven options (along with the options of other items) to determine which option (and, conversely, which of the various options across the other items) would result in the maximum net delivery efficiency. That option may be selected.

Once the containerization decision 140 is generated and identifies the items, the start delivery locations, and the end delivery locations, the management system 130 may also generate an identifier 142 and metadata 144 per container. An identifier 142 may uniquely identify a container. For example, a handling system (e.g., a printer thereof) may print a barcode (or some other means to retain information) that encodes the identifier 142. The same or other handling systems (e.g., barcode readers thereof) may scan the barcode, read the identifier 142, and identify the container. The metadata 144 may include the identifier 142 and may store further information that identifies the items and any hierarchy of items and/or sub-containers grouped in the container, the start delivery location, the end delivery location, the type of the container (e.g., logical or physical), instructions for handling the container, among other information. A handling system may access the metadata based on the identifier 142 and may handle the container based on the stored information. In other words, the identifier 142 may uniquely identify the container and may allow a way to track the container. The metadata 144 may provide information about the container and how the container should be formed, handled, and broken.

In an example, the management system 130 may store the identifier 142 and the metadata 144 locally or at a remote storage. Upon demand or via a push, the identifier 142 and/or the metadata 144 may be distributed to handling systems at the delivery locations. Specifically, the identifier 142 and the metadata 144 need not, but can be both distributed. For instance, it may be sufficient to distribute the identifier 142 to a handling system. The handling system may use the distributed identifier 142 to query the management system 130 (or the remote storage) for specific information from the metadata 144. In this way, network bandwidth associated with distributing the identifier 142 and the metadata 144 may be saved. Likewise, memory storage may be saved at the handling system.

In another example, a barcode may printed or produced and attached to the container (attached physically in the case of a physical container, or attached virtually—e.g., linked—in the case of a logical container). The barcode may not only encode the identifier 142, but also the metadata 144. In this example, the identifier 142 and the metadata 144 may travel together along with the container.

In the interest of clarity of explanation, FIG. 1 illustrates a forward utilization of the delivery network 110 where items may be delivered from source locations to destination location 120 based on customer orders for the items. However, a backward utilization is likewise possible. Specifically, items may be returned to the same source locations or some other delivery locations within the delivery network 110. In this case, containerization may also be applied if delivery (or, more accurately, return) efficiency is improved.

Figure 2:
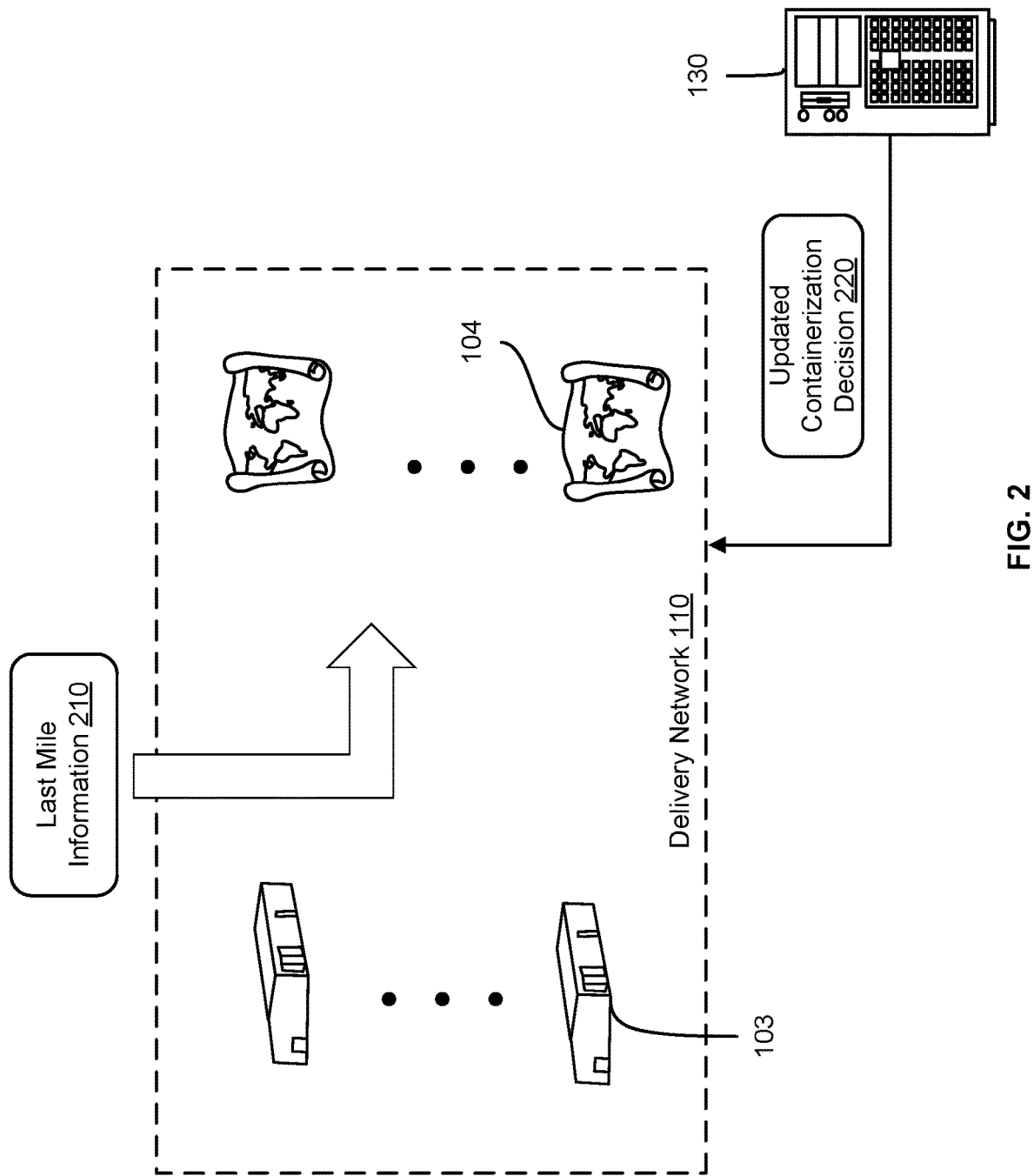
FIG. 2 illustrates an update to a containerization decision based on last mile information, according to an embodiment of the present disclosure.

FIG. 2 illustrates an update to a containerization decision based on last mile information. As described herein above, the management system 130 may determine that, for certain items to be delivered within a time period, containerization should be performed. As the time progresses and before the elapse of the time period, certain last mile information 210 related to the deliveries may become available. The management system 130 may further refine the existing containerization decision by generating an update thereto or a new containerization decision, resulting in an updated containerization decision 220.

In an example, the last mile information 210 may include route information. The route information may identify a specific route that a delivery vehicle may follow to deliver items. The route may cover multiple delivery zones 104. To illustrate, items may be delivered with a two day time period to end destinations through the delivery network 110. The day of the delivery (e.g., the second day), the last mile information 210 may become available and may be used to schedule different delivery vehicles to complete the deliveries. In another example, the route information may additionally or alternatively include hub-and-spoke information and/or vehicle transfer information. The hub-and-spoke information may provide data related to pick-up locations where items may and/or containers may be available for pick-up and loading onto delivery vehicles. The vehicle transfer data may provide information about locations where items and/or containers may be transferred between delivery vehicles.

Hence, the last mile information 210 may include data relevant to the deliveries. The management system 130 may use this data to improve the delivery efficiency. Specifically, the management system 130 may further refine the containerization by generating the updated containerization decision 220 given the last mile information 210.

Various refinements may be possible. Generally, once the last mile information 210 becomes available, its availability may trigger the management system 130 to perform the refinement. In addition because the last mile information 210 may not be available until late binding, any new containerization may be limited to logical containers. In an example, if route information specifies that a delivery vehicle is scheduled to deliver items within multiple delivery zones, the updated containerization decision 220 may specify a containerization of the items (or containers, depending on the existing containerization decision) for each of the delivery zones to a same logical container, thereby resulting in a logical container per delivery zone. The updated containerization decision 220 may also specify a containerization of such logical containers to a top level logical container that corresponds to the collection of the delivery zones for the route. The logical containers may be hierarchically organized within the top level logical container based on the sequence of the delivery zones within the route (e.g., a first visited delivery zone would be at one level below the top level, whereas a last visited delivery zones would be at the lowest hierarchy level). Hub-and-spoke information and transfer information may similarly be used to constraint any refinement to logical containers.

In another example, recursive optimization may be performed. Specifically, a first global optimization may be performed to generate a containerization decision given the item records and the inventory records. As the items and/or containers move from one delivery location to a next delivery location, the optimization may be re-run again for the next delivery location (e.g., localized to the next delivery location given the items and/or containers to be handled by that delivery location). At one point in time, the last mile information 210 may become available. Thus, if the optimization is re-run thereafter, the last mile information 210 may become an input to subsequent containerization decisions.

Figure 3:
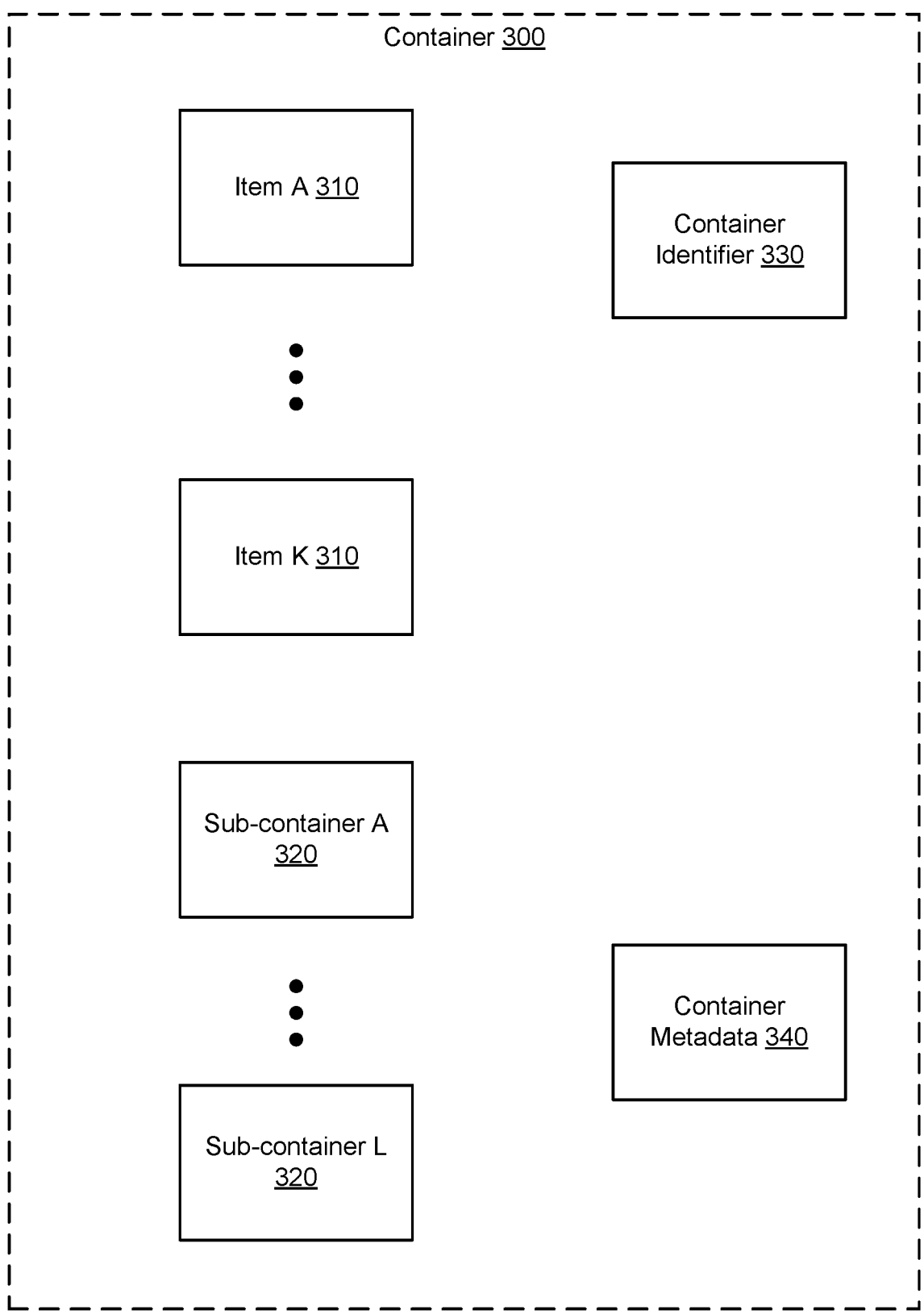
FIG. 3 illustrates an example container, according to an embodiment of the present disclosure.

FIG. 3 illustrates an example container. Generally, a container 300 may be a physical container or a logical container. A physical container may represent a physical means for containing multiple items and/or or other containers (which may be referred to herein as "sub-containers" for clarity) for a period of time, such as a bag, a box, a pallet, a holder, or other physical containing means. In other words, the physical container may physically contain contents (e.g., items and/or sub-containers) and may be physically handled by material handling equipment of a handling system. Rather than handling each of the contents individually, the material handling equipment may instead handle the physical container. In comparison, a logical container may represent a logical means for containing items and/or sub-containers for a period of time, such as a virtual link, a virtual address, or other logical containing means. Accordingly, the logical container may logically contain contents, thereby indicating an association between the contents. The association may be physical (e.g., the items co-located in a particular location) or logical. Rather than physical handling, a computing resource may handle the logical container by processing information related thereto. For instance, rather than having to process scans of individual barcodes of items, the computing resource may process only an identifier of the logical container.

In existing delivery systems, a physical container is typically used to deliver an item. For example, the item is packaged inside the physical container for the delivery. In comparison, a container refers herein to a physical or logical means for containing multiple items, where each item may or may not be packaged in a physical container as done with the existing delivery systems.

Figure 4:
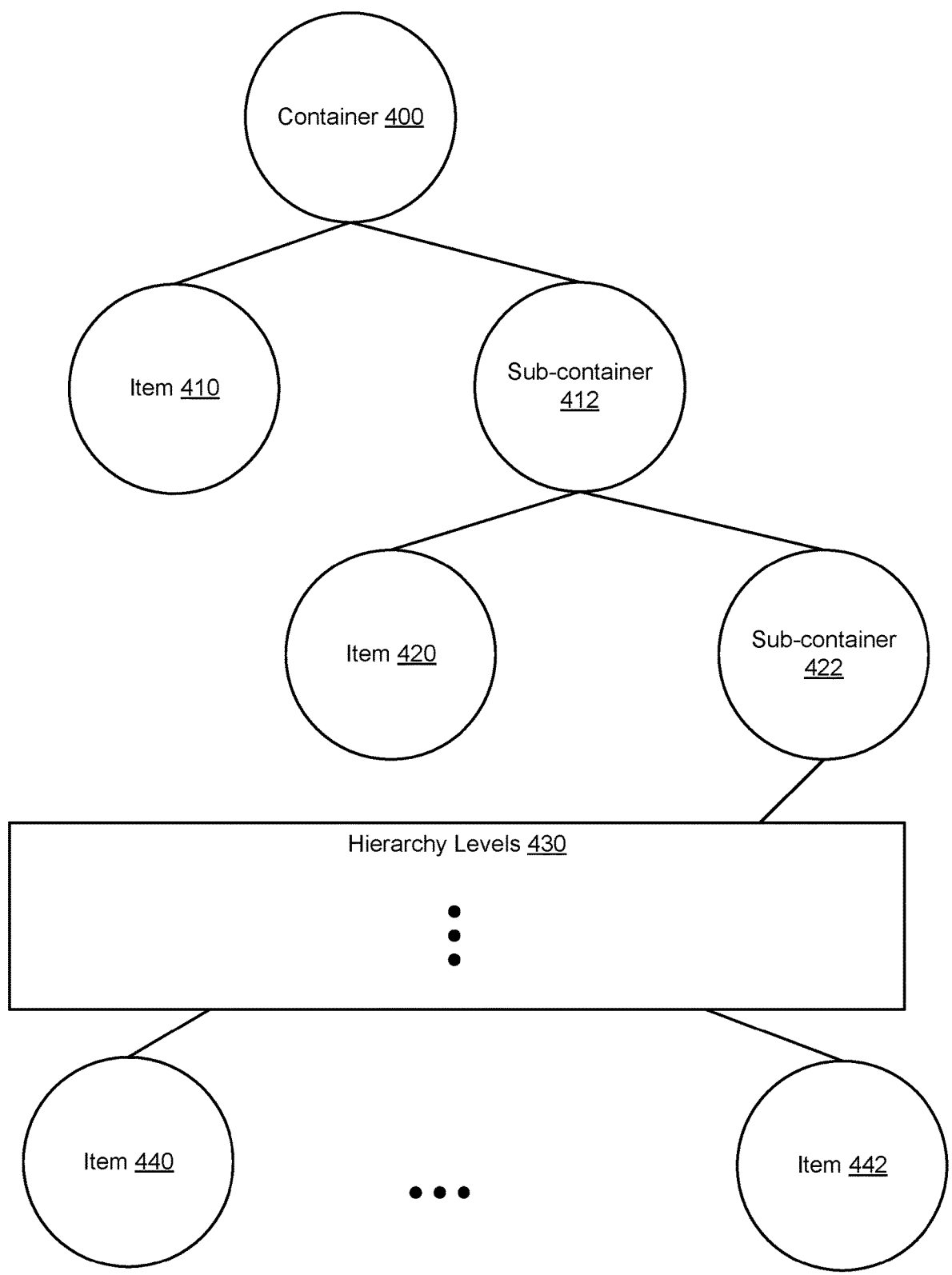
FIG. 4 illustrates an example hierarchy of contents within a container, according to an embodiment of the present disclosure.

As illustrated, the container 300 may include a number of items 310 and/or a number of sub-containers 320. If the container's 300 type is physical, such contents may be physically included in the container 300. In comparison, if the type is logical, the contents may be logically included in the container 300. Each of the sub-containers 320 may in turn represent a container containing a number of items and/or other sub-containers. Accordingly, the container 300 may include a hierarchy of items and sub-containers. FIG. 4 further illustrates the hierarchy.

The container 300 may be associated with an identifier 330 and metadata 340. The identifier 330 may uniquely identify the container 300 to various handling systems. The metadata 340 may identify and/or describe the items 310, sub-container 320, a start delivery location where the container 330 should be formed, an end delivery location where the container 330 should be terminated, handling instructions, type of the container 300, and/or other information related to the items 310, sub-container 320, and/or container 300. The metadata 340 may further include the identifier 330.

In an example, the container 300 may be a physical container. In this example, the identifier 330 may be used to generate (e.g., print) a barcode (or some other means for encoding information) that encodes the identifier 330. The barcode may be attached to the container 300 (e.g., to a surface thereof). In this example, the barcode may also encode the metadata 340 such that both the identifier 330 and the metadata 340 may travel with the container 300.

In an example, the container 300 may be a logical container. In this example, the identifier 330 may be linked to the logical container (e.g., included therein or remote therefrom and addressed therein). Likewise, the metadata 340 may be linked to the logical container.

FIG. 4 illustrates an example hierarchy of contents within a container 400. The hierarchy may be formed of multiple levels. Within the hierarchy, the contents may be represented as nodes. The container 400 may sit at a top level, representing a parent node to all other nodes in the hierarchy.

At each level of the hierarchy, multiple nodes may exist reflecting that the nodes at this hierarchy level may share a common sequence of delivery locations. As illustrated, an item 410 and a sub-container 412 may sit at the next level of the hierarchy, although a different number of items and/or sub-containers may exist at this level. Similarly, at the third level of the hierarchy, an item 420 and a sub-container 422 may sit. This hierarchical distribution may be repeated at different levels 430 until a last, bottom level. At the bottom level, the nodes may only represent items (e.g., shown as items 440 and 442 in FIG. 4).

Hence, an item may be represented in the hierarchy as a child node that has a parent node (e.g., a sub-container or the container 400). A sub-container may be represented in the hierarchy as a parent node to other nodes and may, in turn, have another parent node (e.g., another sub-container or the container 400).

Although FIG. 4 illustrates a top-down hierarchy, other directions for hierarchies may be used, such as a bottom up direction (e.g., where the container 400 sits at the bottom and only items at the top).

The handling of the container 400 may depend on the direction of the hierarchy. For example, in the top-down direction for the hierarchy of FIG. 4, the contents may be grouped in the container 400 from the bottom up (e.g., starting at the lowest level of the hierarchy and moving up) to form the container 400. To terminate the container, the contents may be ungrouped from the container 400 from the top to the bottom (e.g., starting at highest level of the hierarchy and moving down). To illustrate, the two items 440 and 442, belonging to the lowest level, may be grouped in the container 400 prior to placing the item 420, belonging to a higher level. Conversely, the item 420 may be ungrouped from the container 400 prior to ungrouping the items 440 and 442.

Hence, the hierarchy may be utilized to generate handling instructions. Specifically, the handling instructions may specify how to assemble and disassemble the container 400 given a hierarchical direction, in addition to specifying how the container 400 as a whole should be handled (e.g., packaged, picked, stowed, moved, etc.).

Figure 5:
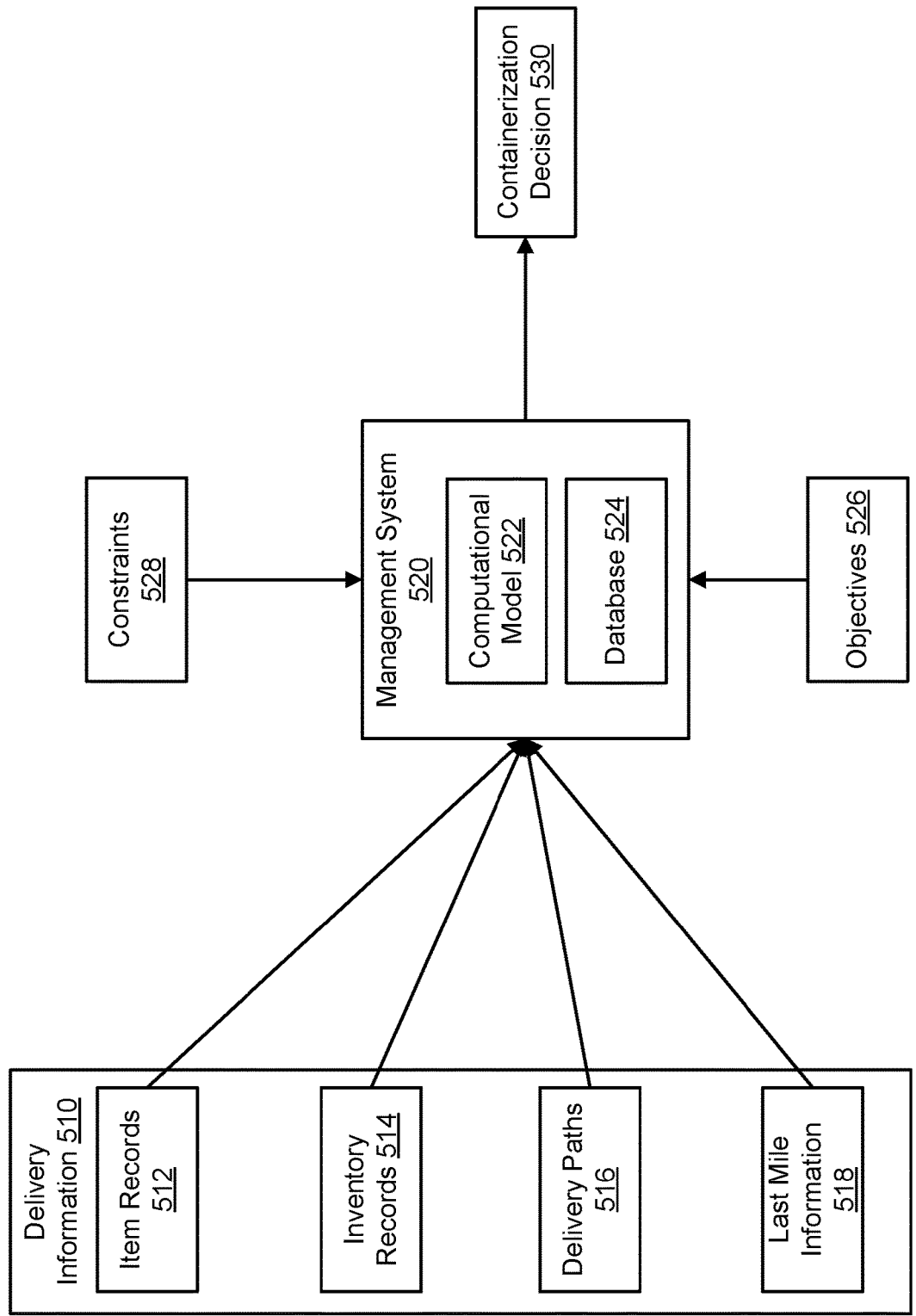
FIG. 5 illustrates an example configuration of a management system to generate containerization decisions, according to an embodiment of the present disclosure.

FIG. 5 illustrates an example configuration of a management system 520 to generate containerization decisions. The management system 520 may be implemented as a server that hosts a computational model 522 and maintain, locally or remotely, a database 524 (or some other data store). The computational model 522 may be run to generate and output a containerization decision 530 based on delivery information 510, given a set of objectives 526 and a set of constraints 528. An example of the computational model 522 is further described in connection with FIG. 6. The database 524 may identify how a service area may be divided into zones and may track allocation and deployment of delivery vehicles across the zones, locations of items, and locations of containers, and may store identifiers and metadata of containers.

The management system 520 may be communicatively coupled with handling systems at various delivery locations within a delivery management. For example, a data network may be available for data communication between the different components. The management system 520 may distribute the containerization decision 530, the identifiers, and/or metadata of the containers to some or all of the handling systems. For example, only handling systems located at delivery locations where containerization should occur (e.g., either start, progress, or end) may receive the relevant identifiers of the containers, thereby enabling these systems to query the database 524 for the metadata. This selective data distribution may reduce network bandwidth and processing utilization.

In an example, items may be destined to destination locations for delivery within a time period (e.g., two days). Shortly before the start of the time period (e.g., the morning of day one), the management system 520 may run the computational model 522, update the database 524, and distribute the containerization decision 530, the identifiers, and/or metadata of the containers to the applicable handling systems. At this stage, the computational model 522 may optimize the containerization decision 530 globally by analyzing the delivery information 510 applicable to all of the destination locations, given a set of objectives 526 and a set of constraints 528. Subsequently, as time progresses and items and containers travel within the delivery network, the management system 520 may re-run the computational model 522 to further refine the containerization decision 530. This re-run may represent a recursive optimization where, for each delivery location, the computation model 522 may analyze localized delivery information, objectives, and constraints. Specifically, for a delivery location, the computational model 522 may consider information about items and containers received by the delivery location, information about remaining portions of the delivery paths (e.g., remaining sub-sequence of delivery locations within the delivery network), any update about last mile information, and objectives and constraints specific to the delivery location.

The delivery information 510 may represent inputs to the computational model 522. The inputs (and, equivalently, the delivery information 510) may include item records 512, inventory records 514, information about delivery paths 516, and last mile information 518. An item record may identify one or more items that a user may have ordered and the related destination location. An inventory record may identify an availability and a source location for an item. Information about a delivery path of an item or of a container may identify a sequence of delivery locations within the delivery network that the item or the container may travel before delivery to the related destination location. The Last mile information 518 may identify route information (e.g., a dynamic route and/or a type of a delivery vehicle for a delivery of items within one or more delivery zones), hub-and-spoke information (e.g., a dynamic location where items may be available for pick-up), and/or vehicle transfer information (e.g., a dynamic location where items may be transferred between delivery vehicles).

The objectives 526 may relate to a delivery efficiency of the delivery network, such as to maximizing this efficiency. The containerization decision 530 may be generated as the best solution that meets the objectives 526. In an example, the objectives 526 may include any of meeting a particular capacity, achieving a particular throughput (e.g., a maximum throughput), minimizing a computational burden (e.g., reducing the amount of computational processing to track and instruct the handling of items), maximize cost savings (e.g., cost of transportation, manpower, number of touches), minimize cost of delivery, and other efficiency-related considerations.

The constraints 528 may impose limitations on the search for the solution and may relate to the items, containers, delivery locations, and/or handling systems. For example, a constraint may limit the type of items that may be grouped in a container (e.g., if two items become a hazard when added to a same physical container, the constraint may prohibit their containerization). Another constraint may also set an upper bound for a delivery time frame (e.g., an item may not be delivered beyond the two-day time period). Yet another constraint may weigh against multiple re-containerizing items. Specifically, the constraint may set that, once an item is grouped in a container, the item may be ungrouped only once to avoid forming and terminating, multiple times, a container that contains the item. A further constraint may set a size limit on a container (e.g., number of items and/or containers, total physical volume, etc.). This constraint may account for the capacity of a handling system and/or delivery vehicle to handle the container.

In an example, the computational model 522 may balance the applicable inputs from the delivery information 510 against the applicable objectives and constraints from the set of objectives 526 and the set of constraints 528. For example, the computational model 522 may generate potential containerizations (e.g., which items and/or sub-containers should be potentially grouped, where the potential grouping and corresponding ungrouping should occur) based on the applicable inputs. Out of the potential containerizations, the computational model 522 may search for the best solution given the applicable objectives and constraints. The best solution may represent a subset of the potential containerizations. The containerization decision 530 may identify this subset.

Figure 6:
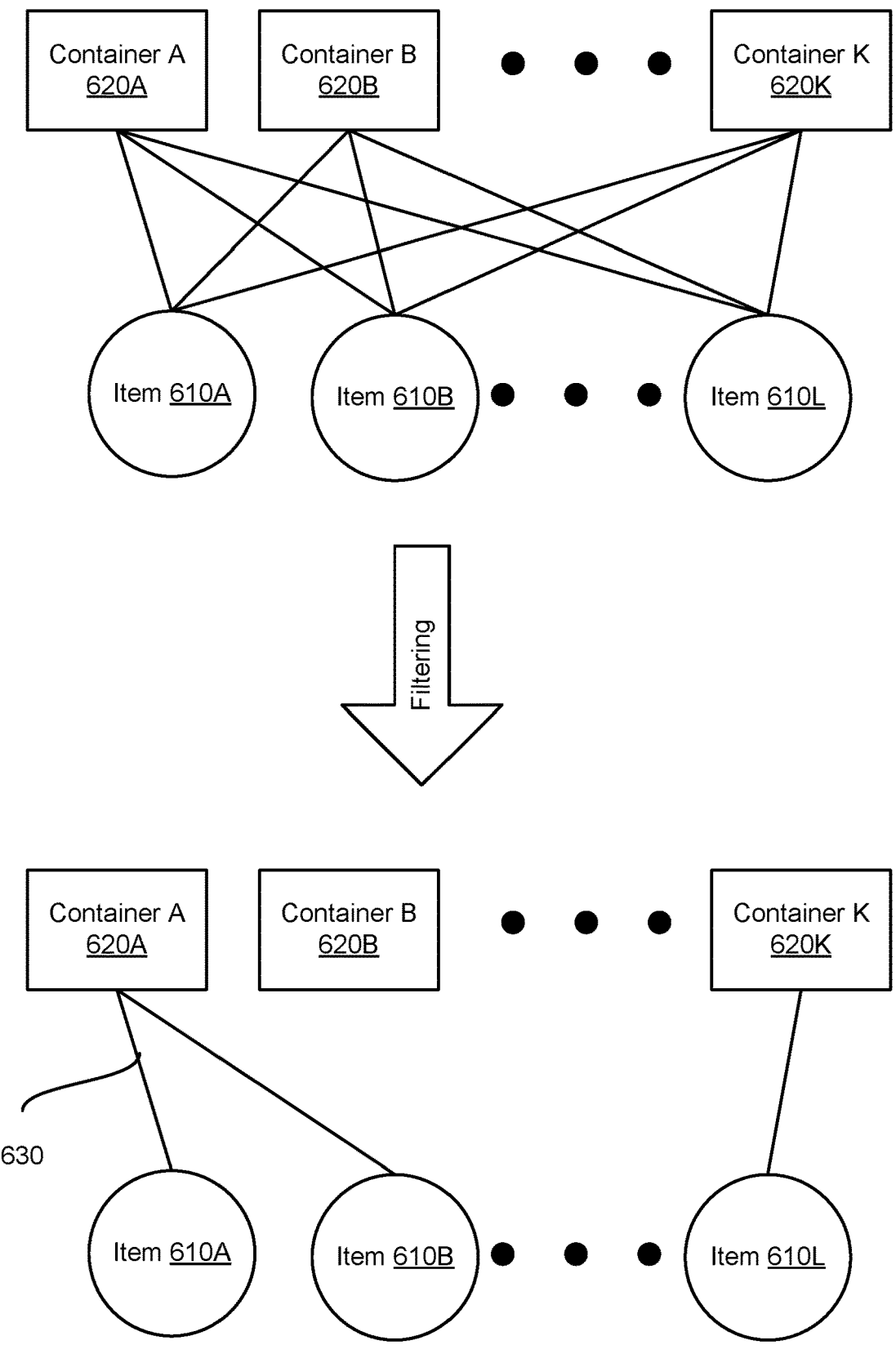
FIG. 6 illustrates an example computational model for generating containerization decisions, according to an embodiment of the present disclosure.

FIG. 6 illustrates an example computational model for generating containerization decisions. In an example, the computational model may map items 610A-610L to potential containers 620A-K. Mappings of items to potential sub-containers and of sub-containers to potential containers and/or potential sub-containers may also be generated. Such mappings are not shown in FIG. 6 in the interest of clarity of explanation, but may be likewise used. Each item may be an ordered item and may be associated with a source location, a destination location, a delivery time frame, and a sequence of delivery locations within a delivery network. Each potential container may represent an option to group, at one of the delivery locations, one or more items mapped thereto and to ungroup, at another delivery location, one or more of the contained items. This option may be generated based on a commonality of the sequence of delivery locations along the delivery paths of the items associated with the option. Hence, the items 610A-610L may represent to be delivered within a time period to destination locations through the delivery network. The potential containers 620A-K represent all potential and unconstrained options to containerize the items given common sequences of delivery locations along delivery paths. At this stage, multiple potential containerization options may exist for an item. Generally, the total number of potential containers "K" may be smaller than the total number of items "L," such that some delivery efficiency may be gained.

Next, the computational model may filter the potential containers 620A-K to select the best option across the different items. The filtering may implement a search for an optimal solution from the potential containers 620A-K that may meet a set of objectives given a set of constraints. In an example, an objective function, or some other search algorithm, may be used to find the optimal solution. The computational model may set the potential containers included in the optimal solution as the actual containers to be used. As illustrated, the optimal solution includes grouping items 610A and items 610B in a container 620A. This grouping may represent a containerization decision 630.

Figure 7:
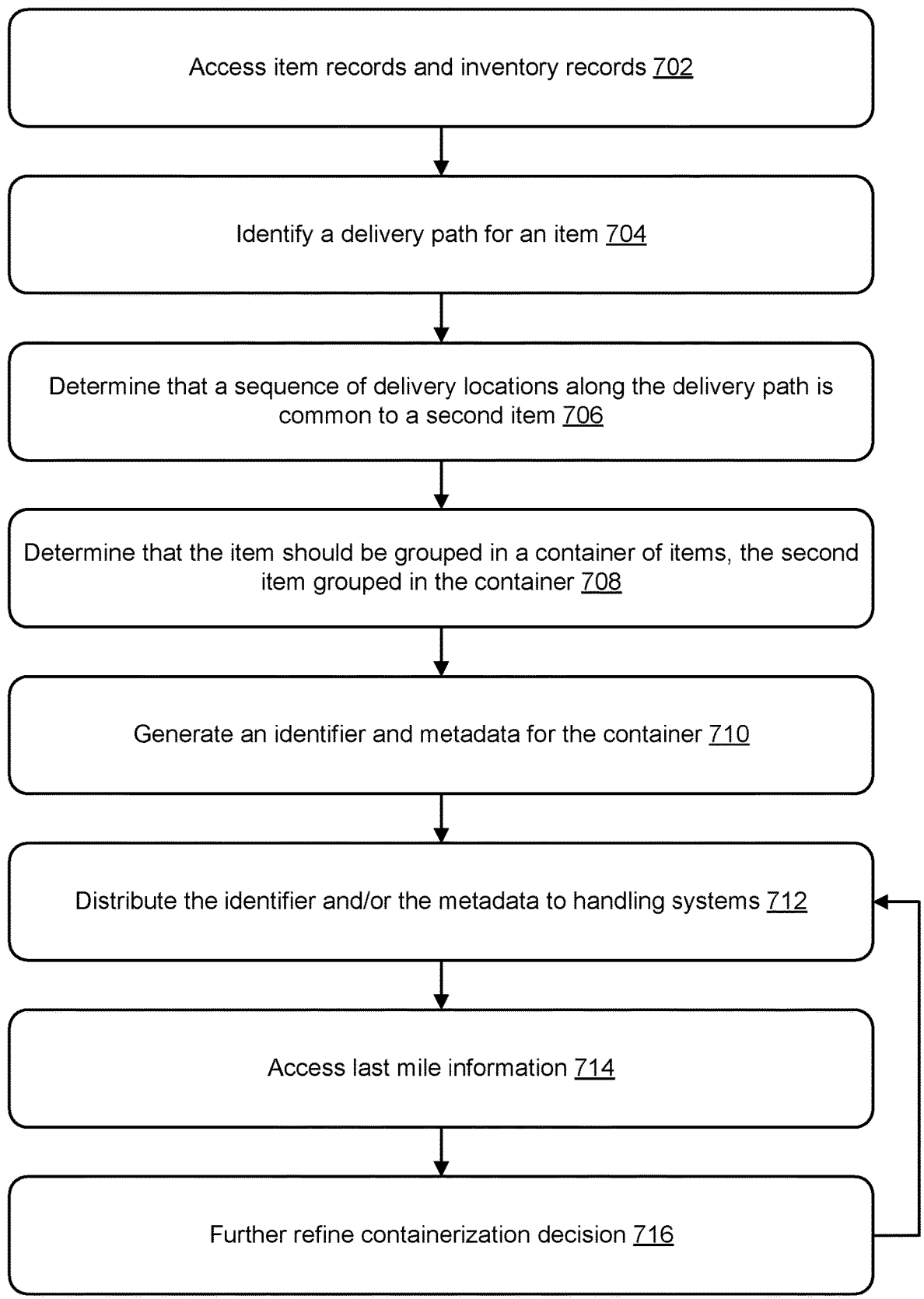
FIG. 7 illustrates an example flow for generating and distributing a containerization decision, according to an embodiment of the present disclosure.
Figure 8:
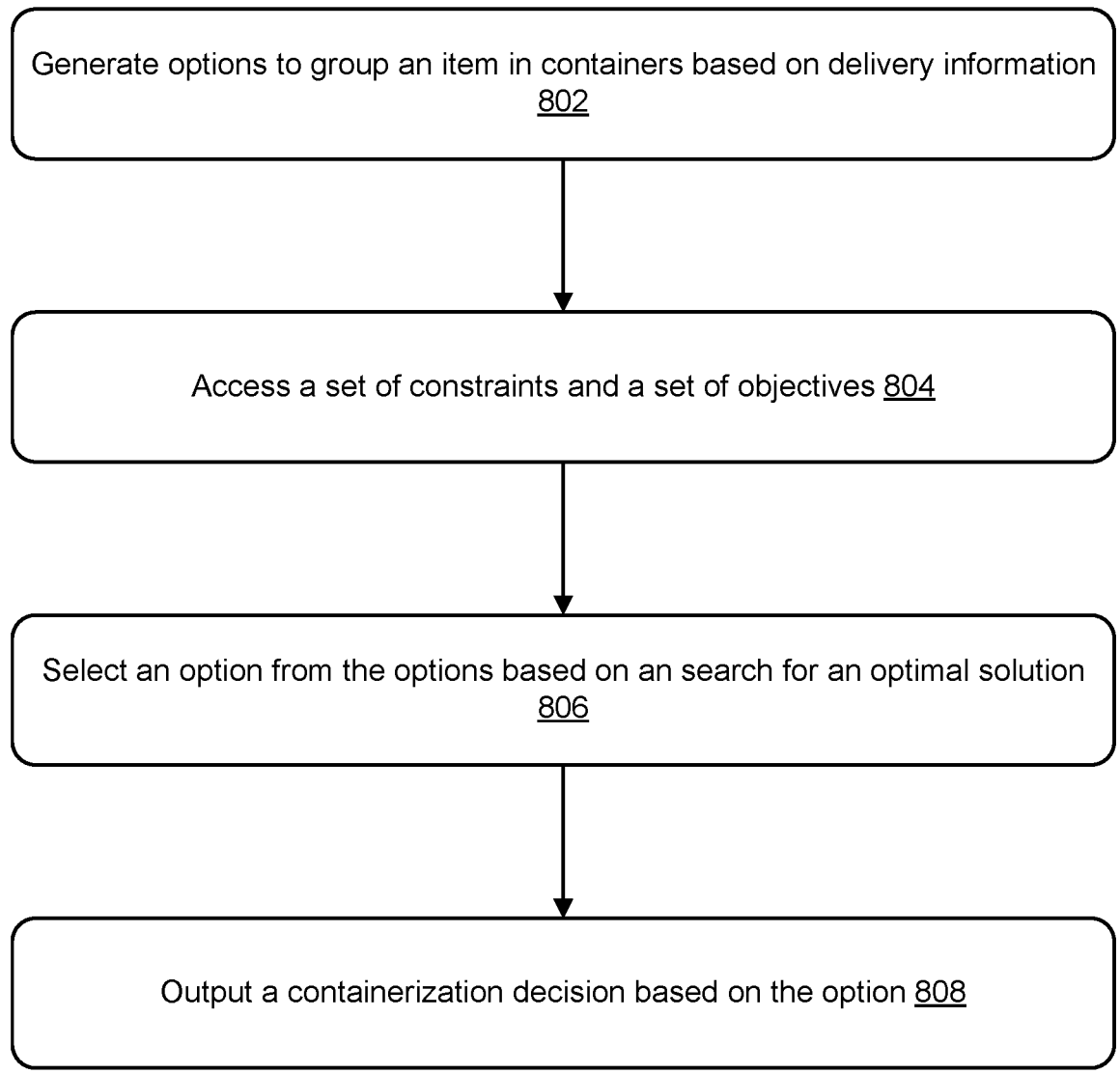
FIG. 8 illustrates an example flow for generating a containerization decision based on an analysis of potential containerizations, according to an embodiment of the present disclosure.

FIGS. 7-8 illustrate example flows for managing item deliveries based on item containerizations. In the example flows, some of the operations may be embodied in, and fully or partially automated by, components executed by one or more processors hosted on management system (e.g., a server or some other computer system), where the management system may be communicatively coupled handling systems (e.g., computer systems thereof) over one or more data networks. In the interest of clarity of explanation, a containerization of an item in a container may be described in connection with the example flows. However, these flows similarly apply to the containerization of a larger number of items and/or sub-containers in a larger number of containers. While the operations are illustrated in a particular order, it should be understood that no particular order is necessary and that one or more operations may be omitted, skipped, and/or reordered. In addition, some of the operations may be similar across the example flows. Such similarities are not repeated herein.

FIG. 7 illustrates an example flow for generating and distributing a containerization decision. The flow may start at operation 702, where the management system may access item records and inventory records. In an example, these records may be stored in a data store (e.g., a database). The management system may query the data store to receive information about the records, including source and destination locations and delivery time periods.

At operation 704, the management system may identify a delivery path for an item. The item may have an item record, may be available from a source location, and may be destined to a destination location for delivery within a time period. In an example, the management system may generate information that identifies the delivery path given the item and inventory records. In another example, this information may be generated by another system and stored at the data store. In this example, the management system may query the data store to receive the information. In both examples, the information may identify a sequence of delivery locations along the delivery path within the delivery network. The management system may identify each of the delivery locations and expected time that the item will arrive to and depart from each of the delivery locations.

At operation 706, the management system may determine that the sequence of the delivery locations is common to a second item. In an example, the second item may be destined to a delivery to a different delivery location within the time period (e.g., both items to be delivered by Tuesday of next week). In another example, no time constraint may be imposed. Instead, the second item may be ordered but need not be delivered within the same time period (e.g., the first items is to be delivered by Tuesday, while the second item is to be delivered by Wednesday). In this example, efficiency may be gained by containerizing both items even though they have different delivery time frames. In an example, the management system may identify a second delivery path of the second item and the corresponding second sequence of delivery locations, similarly to the operation 704. The management system may compare the two sequences to determine a sequence commonality. The sequence commonality may indicate that the two items may be handled by a common set of delivery locations, where the two items may arrive to one delivery location around the same time frame, depart from another delivery location around the same time frame, and, possibly, travel across in-between delivery locations.

At operation 708, the management system may determine that the item should be grouped in a container of items. The container may also group (already or subsequently) the second item and possibly other items (depending on sequence commonality). In an example, the management system may generate a containerization decision that identifies the item, the container (as applicable, such as if the container is pre-existing), the start delivery location where the item should be grouped in the container, the end delivery location where the item should be ungrouped from the container, and instructions related to handling the item, the grouping and ungrouping, and handling the container.

To do so, the management system may analyze delivery information about the potential containerization of the item and of other items across multiple containers and different delivery locations. As such, the decision to group the item in the container may not be limited to delivery information about only the item, but may be a result of a global analysis that considers, among other things, the type of the item, the number of the items grouped in the container, a volume of total items expected at the delivery locations during the period of time, a handling capacity of each delivery location during the period of time, a constraint associated with the container, and/or other factors as described in connection with the previous figures.

The analysis may search for a containerization decision that may increase a delivery efficiency through the delivery network. For example, the analysis may represent an optimization that searches for the maximum delivery efficiency improvement (e.g., set an as objective) given the delivery information and a set of constraints. In an example, the optimization may be performed by running a computational model hosted on the management system. The delivery information may be an input to the computational model and the containerization decision may be an output therefrom. The computational model may search for the optimal containerization decision given the input to achieve a set of objectives (e.g., improvements to the delivery efficiency), while being subject to a set of constraints. An example of this search is further described in connection with the next figure. The optimization may be global, where the delivery information, the objectives, and the constraints may be applicable to all the items to be handled across all the delivery locations within the delivery network during the time period. After an initial global optimization, the optimization may become recursive where the containerization decision may be further refined to each delivery location by localizing the delivery information, the objectives, and the constraints to the delivery location.

At operation 710, the management system may generate an identifier and metadata for the container. The identifier may include a number of alphanumerical characters and/or graphical objects to uniquely identify the container. The metadata may identify the item, along other contents of the container, a location of the contents, the start delivery location for grouping the item in the container, an end delivery location for ungrouping the item from the container, handling instructions, a hierarchy of contents, a type of the container, a destination location of the container (e.g., a normalized delivery address—e.g., a common root address—given the delivery addresses of the content; if the container is to be terminated at the end delivery destination, the normalized delivery address may be that of the end delivery destination), and/or other item and container-related information relevant to the handling and delivery of the item and/or container.

At operation 712, the management system may distribute the identifier and/or the metadata to handling systems. The distribution may be a broadcast or may be provided on demand. The distributed information may cause the handling systems to handle the container of the items instead of handling each of the items separately. For example, upon a receipt of the item at the start delivery location, a first handling system housed thereat may read a first identifier attached to the item (e.g., a barcode). That the first identifier may be matched by the handling system (or based on a query to the management system) with information from the metadata. Instructions, available from the metadata, may then be provided to the first handling system to group the item in the container based on the match. The first handling system may do so.

Conversely, upon receipt of the item at the end delivery location, a second handling system housed thereat may read the identifier of the container, access the metadata, and determine that the item is to be ungrouped from the container based on ungrouping instructions available from the metadata. The second handling system may do so accordingly. For handling systems housed in delivery locations between the start and end delivery locations, each handling systems may similarly read the identifier, access handling instructions from the metadata, and handle the container accordingly.

In an example, the container may be a physical container. Accordingly, the first handling system may print a barcode that encodes the identifier and, optionally, the metadata and may attach the barcode to the physical container. The barcode may be used thereafter by the first handling system and other handling systems to handle the container as if the container was a single item. Specifically, upon a scan of the barcode by any of such handling systems, the metadata may be accessed, thereby providing handling instructions to handle the container. In an illustration, the metadata may identify a hierarchy of items and sub-containers. The handling instructions may be specified according to the hierarchy. [0073] At operation 714, the management system may access last mile information about deliveries the items and/or containers, such as route information, hub-and-spoke information, and/or vehicle transfer information. Generally, the last mile information may become available (e.g., during a time frame when the items/containers are about to be loaded on the delivery vehicles for routing to delivery zones or to leave the delivery network to destination locations). The management system may access this information from the data store or from other computer system responsible for the route planning and may accordingly further refine the containerization.

At operation 714, the management system may further refine the containerization decision based on the last mile information. When the last mile information becomes available, the computational model may be re-run within information as an input thereto. In an example, adding the item to a physical container may be too costly (e.g., may not decrease the delivery efficiency) during the late binding and, thus, may be constrained (e.g., completely avoided). Instead, a logical container may be used. Specifically, the item and/or any physical container containing the item and other items may be grouped with other items and/or containers in a logical container. Similarly, if the optimization is re-run for edge delivery locations (e.g., ones belonging to the last mile delivery), the type of the container may be constrained to a logical container. Upon refining the containerization decision (e.g., updating it to include additional item grouping and/or ungrouping), the relevant information (e.g., new identifiers and new metadata for new containers and/or updated metadata for existing containers) may be re-distributed to the handling systems, similarly to the operation 712.

FIG. 8 illustrates an example flow for generating a containerization decision based on an analysis of potential containerizations. Operations of this flow may be implemented as sub-steps of the operation 708 of FIG. 7. The management system may implement a computation model to perform the operations of the flow.

The flow may start at operation 802, where the management system may generate options to group the item in containers based on delivery information. The delivery information may be specific to an item and additional items to be delivered within a time period. Each option may represent a potential containerization of the item in a particular container, where the particular container may be of a particular type (e.g., logical or physical), include other potential items from the additional items, be formed at a potential start delivery location, and be terminated at a potential end delivery location. The item and the potential items may share (in location and time) the start and end delivery locations, along with other possible in-between delivery locations. In other words, the options may represent all possible, unconstrained ways to group and ungroup the item with combinations of other items and/or sub-containers at the applicable delivery locations based on sequence commonalities. A similar operation may be performed to generate additional options for the additional items.

At operation 804, the management system may access a set of constraints and a set of objectives. If a global optimization is to be performed, the constraints, objectives, and the delivery information may be applicable to the delivery network. If a recursive optimization is to be performed for a delivery location, the constraints, objectives, and/or the delivery information may be localized to that delivery location. In an example, the constraints, objectives, and the delivery information may be accessed from the data store.

At operation 806, the management system may select an option for the item from the options for the item based on a search for an optimal solution. The option may represent the optimal solution. In an example, the optimal search may consider all of the options for all of the items in light of the set of constraints and the set of objectives. For instance, the management system may determine any delivery improvement (e.g., any delivery efficiency gain) for each option, may compare the delivery improvements across the options, and may select the option for the item and the options for the additional items that may result in the maximum delivery improvements. To do so, the search for the optimal solution may be expressed as an optimization problem to be solved using an objective function. The objective function may use the objectives and constraints to search through the options for the optimal solution.

At operation 806, the management system may output the containerization decision based on the option for the item. The containerization decision may also be based on the selected options for the other items. For example, the containerization decision may identify, for each of the items, whether the item should be containerized and the applicable container, start delivery location, and end delivery location.

Figure 9:
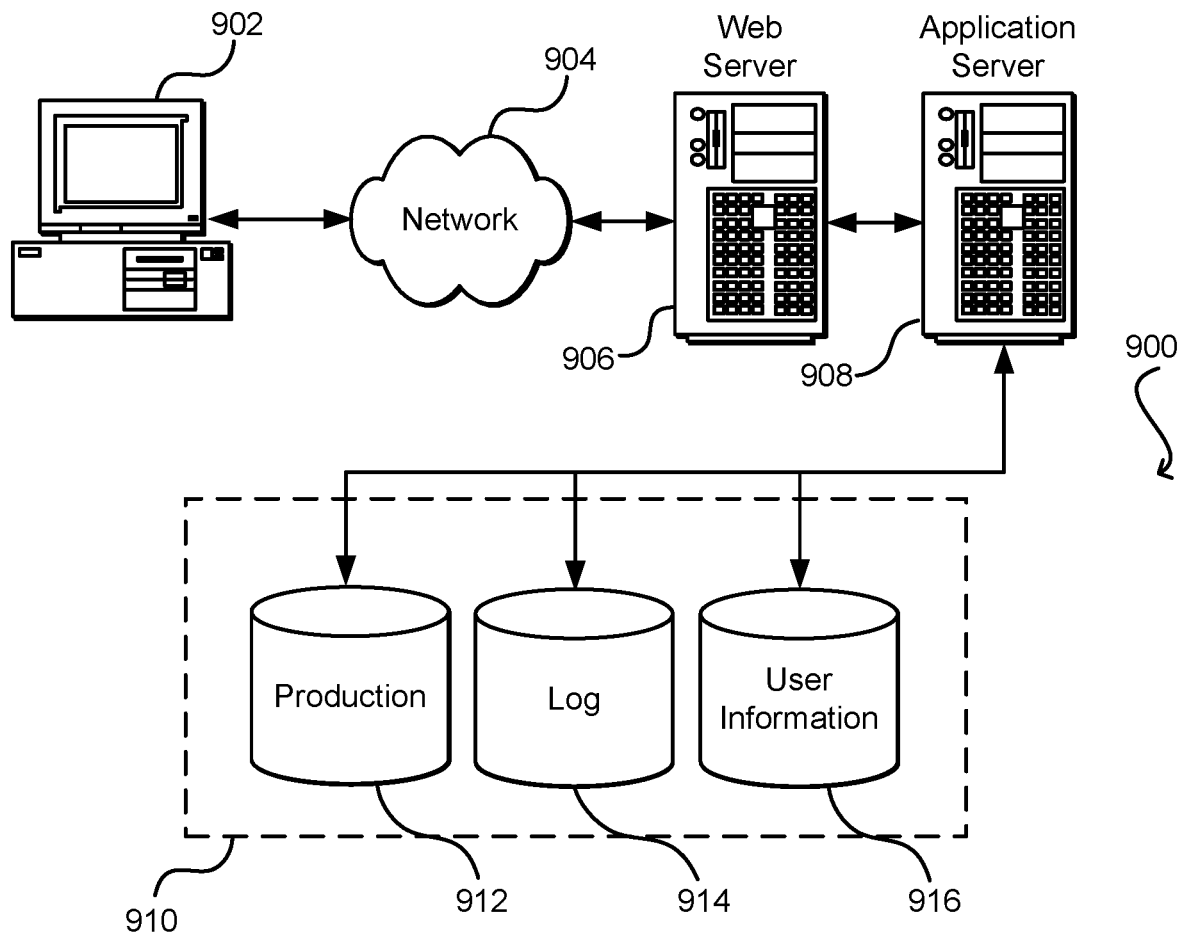
FIG. 9 illustrates aspects of an example environment for implementing aspects of a delivery system, according to an embodiment of the present disclosure.

FIG. 9 illustrates aspects of an example environment 900 for implementing aspects of a management system. The example environment 900 may include components (e.g., computer systems available to host modules and store data) that may be implemented within the management system. As will be appreciated, although a Web-based environment is used for purposes of explanation, different environments may be used, as appropriate, to implement various embodiments. The environment includes an electronic client device 902, which can include any appropriate device operable to send and receive requests, messages, or information over an appropriate network 904 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases, or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, analysis, or other such purposes. It should be understood that there can be many other aspects that may need to be stored in the data store, such as page image information to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A system for containerizing items during a set of item handling sequence steps that are adapted to be stored in an inventory management system of an item handling facility, comprising:
a management system communicatively coupled with the inventory management system over a data network and configured to at least:
identify that a handling sequence of a first item, a handling sequence of a second item, and a handling sequence of a third item comprise a common set of sequence steps;
determine, based at least in part on the common set, that the first item and the second item are to be grouped in a sub-container of a container at a first location and that the sub-container and the third item are to be grouped in the container at a second location;
generate metadata for the container, the metadata indicating a containerization hierarchy that comprises a plurality of hierarchy levels, the first item and the second item identified in the metadata at a first level of the plurality of hierarchy levels, the sub-container and the third item identified in the metadata at a second level of the plurality of hierarchy levels, the first level corresponding to the first location, the second level corresponding to the second location, the metadata further identifying the sub-container and the first location and comprising a first set of instructions to group the first item and the second item in the sub-container at the first location, the metadata further identifying the container and the second location and comprising a second set of instructions to group the third item and the sub-container in the container at the second location; and
distribute the metadata of the container to the inventory management system, wherein:
a handling system of a sequence step belonging to the common set of sequence steps is configured to handle the container as a single item based at least in part on the metadata of the container.

2. The system of claim 1, wherein distributing the metadata of the container comprises sending the metadata to a first handling system of at the first location over the data network, and wherein the first handling system is further configured to:
read a first identifier attached to the first item;
determine that the first item is to be grouped in the container based at least in part on a match between the first identifier of the first item and the metadata of the container; and
group the first item in the container based at least in part on the match.

3. The system of claim 1, wherein distributing the metadata of the container comprises sending the identifier and the metadata to a second handling system at a second handling facility over the data network, and wherein the second handling system is further configured to:
determine that the first item is to be ungrouped from the container based at least in part on the metadata of the container identifying the first item and the second handling facility; and
ungroup the first item from the container based at least in part on the determining that the first item is to be ungrouped.

4. The system of claim 1, wherein an end node of the containerization hierarchy corresponds to an item of the items, and wherein a parent node of the containerization hierarchy corresponds to the sub-container, wherein a top node of the containerization hierarchy corresponds to the container, wherein the items are ungrouped from the container based at least in part on a top-down utilization of the containerization hierarchy.

5. A computer-implemented method, comprising:
identifying, by a computer system, a first handling sequence of a first item within a delivery network;
identifying, by the computer system, sequence steps along the first handling sequence, the sequence steps identified based at least in part on being common with a second handling sequence of a second item and a third handling sequence of a third item within the delivery network;
determining, by the computer system and based at least in part on the sequence steps, that the first item and the second item are to be grouped in a sub-container of a container at a first location within the delivery network and that the sub-container and the third item are to be grouped in the container at a second location within the delivery network;

generating, by the computer system, metadata for the container, the metadata indicating a containerization hierarchy, the first item and the second item identified at a first level of the containerization hierarchy, the sub-container and the third item identified at a second level of the containerization hierarchy, the metadata further identifying the sub-container and the first location and comprising a first set of instructions to group the first item and the second item in the sub-container at the first location, the metadata further identifying the container and the second location and comprising a second set of instructions to group the third item and the sub-container in the container at the second location; and distributing, by the computer system, at least one of the identifier or the metadata to one or more handling systems, wherein the distributing causes a handling system located at the first location to identify the container based at least in part on the first item or the second item and group, based at least in part on the metadata, the first item in the container.

6. The computer-implemented method of claim 5, wherein handling sequences comprise delivery locations, and wherein the metadata further identifies at least one of: a type of the container, a location of the container, or instructions for handling the container.

7. The computer-implemented method of claim 5, wherein the container is a logical container based at least in part on a first sequence step of the first handling sequence being an edge delivery location of a delivery network.

8. The computer-implemented method of claim 5, wherein the sequence steps comprise delivery locations, and wherein determining that the first item is to be grouped in the container is further based at least in part on a type of the first item, a number of items grouped in the container, a volume of total items expected at the delivery locations during a period of time, a handling capacity of the first location during the period of time, and a constraint associated with the container.

9. The computer-implemented method of claim 5, the sequence steps comprise delivery locations, and wherein the determining that the first item is to be grouped in the container is performed by a computational model hosted on the computer system, and wherein the computer model is configured to output a decision about grouping the first item in the container based at least in part on delivery information, a set of constraints, and a set of objectives.

10. The computer-implemented method of claim 9, wherein the decision is outputted by at least:
generating options to add the first item to and remove the first item from one or more containers at one or more delivery locations; and
selecting an option from the options based at least in part on the set of constraints and the set of objectives.

11. The computer-implemented method of claim 10, wherein the delivery information, the set of constraints, and the set of objectives are global and associated with total items to be handled by the delivery locations within a period of time.

12. The computer-implemented method of claim 9, wherein the computational model is run for a delivery location upon receipt by the delivery location of the first item, and wherein running the computational model comprises localizing the delivery information, the set of constraints, and the set of objectives to the delivery location.

13. A non-transitory computer-readable storage medium comprising instructions that, upon execution on a system, configure the system to perform operations comprising:
identifying, based at least in part on a first delivery destination location of a first item, a sequence of delivery locations along a first delivery path to the first delivery destination location, the delivery locations individually configured to handle the first item in preparation for delivery to a next handling location or to the first delivery destination location;
determining that the first item is to be grouped at a first location in a sub-container of a container of items based at least in part on a sequence commonality, the sequence commonality indicating that a second item is to be grouped in the sub-container at the first location and a third item is to be grouped in the container at a second location;
generating metadata for the container, the metadata indicating a containerization hierarchy, the first item and the second item identified at a first level of the containerization hierarchy, the sub-container and the third item identified at a second level of the containerization hierarchy, the metadata further identifying the sub-container and the first location and comprising a first set of instructions to group the first item and the second item in the sub-container at the first location, the metadata further identifying the container and the second location and comprising a second set of instructions to group the third item and the sub-container in the container at the second location; and
distributing the metadata to one or more handling systems, wherein the distributing causes a handling system located at a third delivery location to identify the container and ungroup, based at least in part on the metadata, the first item from the container for separate handling from the second item.

14. The non-transitory computer-readable storage medium of claim 13, wherein the metadata comprises a destination location for the container, and wherein the destination location corresponds to the third delivery location.

15. The non-transitory computer-readable storage medium of claim 13, wherein determining that the first item is to be grouped in the container comprises:
generating options for grouping different combinations of the items at each of the delivery locations; and
selecting an option of the options based at least in part on relative comparison of delivery improvements resulting from the options.

16. The non-transitory computer-readable storage medium of claim 13, wherein the operations further comprise:
determining that a set of the delivery locations are associated with a route served by a delivery vehicle;
identifying containers destined to the set of the delivery locations; and
generating a logical container that groups the containers.

17. The non-transitory computer-readable storage medium of claim 13, wherein an identifier of the container is distributed with the metadata, and wherein the distributing causes a first handling system of the first delivery location to print a barcode that encodes the identifier and the metadata of the container.

18. The non-transitory computer-readable storage medium of claim 17, wherein the barcode causes a handling of the container as a single item.

19. The non-transitory computer-readable storage medium of claim 17, wherein upon a scan of the barcode by the first handling system, the metadata is accessed by the first handling system and identifies handling instructions to handle the container.

20. The computer-implemented method of claim 5, further comprising:
   generating, after the metadata is distributed, an association of the first item with a logical container applicable to a third location within the delivery network, wherein the metadata indicates that the first item is to be ungrouped from the container at the third location; and
   generating second metadata for the logical container, the second metadata indicating that the first item is to be grouped with a fourth item at the third location.

\* \* \* \* \*